(12) United States Patent
Poole

(10) Patent No.: US 9,964,779 B2
(45) Date of Patent: May 8, 2018

(54) INTERCHANGEABLE GLASSES SYSTEM

(71) Applicant: Monique Poole, North Hollywood, CA (US)

(72) Inventor: Monique Poole, North Hollywood, CA (US)

( * ) Notice: Subject to any disclaimer, the term of this patent is extended or adjusted under 35 U.S.C. 154(b) by 71 days.

(21) Appl. No.: 14/696,436

(22) Filed: Apr. 25, 2015

(65) Prior Publication Data

US 2015/0309331 A1  Oct. 29, 2015

Related U.S. Application Data

(60) Provisional application No. 61/984,585, filed on Apr. 25, 2014.

(51) Int. Cl.
*G02C 5/14* (2006.01)
*G02C 7/10* (2006.01)
*G02C 5/22* (2006.01)

(52) U.S. Cl.
CPC .............. *G02C 5/146* (2013.01); *G02C 7/10* (2013.01); *G02C 5/22* (2013.01); *G02C 2200/02* (2013.01); *G02C 2200/08* (2013.01)

(58) Field of Classification Search
CPC ............ G02C 2200/08; G02C 2200/04; G02C 2200/06; G02C 2200/20; G02C 2200/02; G02C 9/04; G02C 9/02; G02C 9/00; G02C 5/006; G02C 5/146; G02C 5/22; G02C 1/10

USPC ....... 351/116, 118, 121, 153, 157, 158, 154, 351/63, 83, 90, 178
See application file for complete search history.

(56) References Cited

U.S. PATENT DOCUMENTS

| | | | | | |
|---|---|---|---|---|---|
| 5,359,370 | A | * | 10/1994 | Mugnier | G02C 5/126 351/111 |
| 5,418,581 | A | * | 5/1995 | Conway | G02C 5/2209 351/116 |
| 5,652,637 | A | * | 7/1997 | Marini | G02C 5/10 351/116 |
| 6,679,604 | B1 | * | 1/2004 | Bove | G02C 5/22 16/228 |
| 2014/0104562 | A1 | * | 4/2014 | Kim | G02C 5/146 351/116 |

FOREIGN PATENT DOCUMENTS

FR    2525354 A1 * 10/1983 .............. G02C 1/04
GB    734208 A  *  7/1955 .............. G02C 1/08

* cited by examiner

*Primary Examiner* — Bumsuk Won
*Assistant Examiner* — Collin X Beatty
(74) *Attorney, Agent, or Firm* — Dodd Call Black, PLLC; Dustin L. Call

(57) ABSTRACT

An interchangeable glasses system. The interchangeable glasses system includes a frame and one or more lenses attached to the frame. The interchangeable glasses system also includes a temple configured to hold the frame in place relative to the user's ears. The interchangeable glasses system further includes an attachment configured to releasably secure the temple relative to the frame.

20 Claims, 2 Drawing Sheets

INTERCHANGEABLE GLASSES SYSTEM

This application claims the benefit of and priority to U.S. Provisional Patent Application Ser. No. 61/984,585 filed on Apr. 25, 2014, which application is incorporated herein by reference in its entirety.

BACKGROUND OF THE INVENTION

Glasses serve an important function. They help to correct a user's vision or protect from radiation, such as sunlight, that might damage the user's eyes. However, many users select glasses based on looks rather than on functionality. That is, the user selects from a multitude of frames (often in the hundreds) and then functional lenses are crafted to match the user's needs (e.g., prescription) and fit into the frame for the user.

Nevertheless, the glasses cannot be customized by the user once they have been created. This reasons for this are twofold: 1) glasses are expensive, therefore most users have only a single pair of glasses or a few pairs; and 2) everything is a single piece so the user either selects the whole pair or rejects the whole pair. Therefore, most users either wear the only pair available or choose the pair that is most compatible with their other fashion choices.

Further, glasses include a number of different temple styles and function. Users are likewise forced to choose the option that most closely resembles their desired function from the limited number of glasses that the user owns.

Accordingly, there is a need in the art for glasses which allow a user to customize the temple of glasses as desired. Further, there is a need for the temples to be changeable, even after selection of the glasses.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes an interchangeable glasses system. The interchangeable glasses system includes a frame and one or more lenses attached to the frame. The interchangeable glasses system also includes a temple configured to hold the frame in place relative the user's ears. The interchangeable glasses system further includes an attachment configured to releasably secure the temple relative to the frame.

Another example embodiment includes an interchangeable glasses system. The interchangeable glasses system includes a frame and one or more lenses attached to the frame. The interchangeable glasses system also includes a temple configured to hold the frame in place relative the user's ears. The interchangeable glasses system further includes an attachment configured to releasably secure the temple relative to the frame. The attachment includes a groove and a protrusion, wherein at least a portion of the protrusion is configured to be received by the groove. The attachment also includes a jacket. The jacket covers at least a portion of the groove, allows movement of the protrusion within the groove, and prevents the protrusion from exiting the groove.

Another example embodiment includes an interchangeable glasses system. The interchangeable glasses system includes a frame, one or more nose pads attached to the frame, and one or more lenses attached to the frame. The interchangeable glasses system also includes a temple configured to hold the frame in place relative the user's ears. The interchangeable glasses system further includes an attachment configured to releasably secure the temple relative to the frame. The attachment includes a groove and a protrusion, wherein at least a portion of the protrusion is configured to be received by the groove. The attachment also includes a jacket. The jacket covers at least a portion of the groove, allows movement of the protrusion within the groove, and prevents the protrusion from exiting the groove. The attachment further includes a channel through the jacket, wherein the channel allows a portion of the protrusion to pass through the jacket and a bearing configured to allow a portion of the protrusion to rotate.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
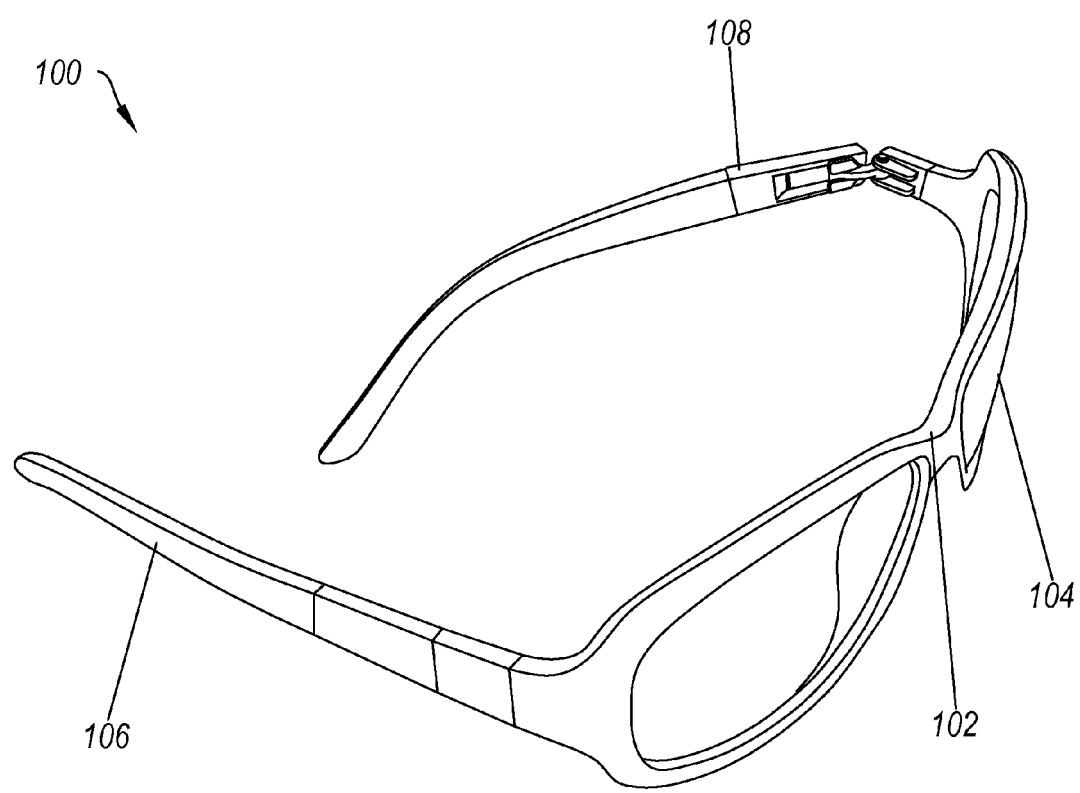
FIG. 1 illustrates an example of an interchangeable glasses system.

FIG. 1 illustrates an example of an interchangeable glasses system 100. The interchangeable glasses system 100 can have one or more portions that are interchangeable, allowing a user to customize the glasses. The interchangeable glasses system 100 can include any desired type of glasses. For example, the interchangeable glasses system 100 can include safety glasses, reading glasses, prescription glasses, sunglasses or any other desired glasses.

FIG. 1 shows that the interchangeable glasses system 100 can include a frame 102. In at least one implementation, the frame 102 can be configured to position the interchangeable glasses system 100 in the correct position while in use. For example, the frame 102 can be configured to fit snugly on the user's head in order to position the interchangeable glasses system 100 for correct use. Additionally or alternatively, the frame 102 can include one or more nose pads. The nose pads can be configured to allow the frame 102 to rest on the user's nose, such that the interchangeable glasses system 100 is positioned correctly while in use. As used in the specification and the claims, the phrase "configured to" denotes an actual state of configuration that fundamentally ties recited elements to the physical characteristics of the recited structure. As a result, the phrase "configured to" reaches well beyond merely describing functional language or intended use since the phrase actively recites an actual state of configuration.

FIG. 1 further shows that the interchangeable glasses system 100 can include one or more lenses 104. In at least one implementation, the one or more lenses 104 can be made of a transparent, or substantially transparent, material. As used in the specification, the term transparent shall mean that the material is capable of transmitting light so that objects or images can be seen as if there were no intervening material, unless otherwise specified. I.e., the user is able to see through the material without a substantial decrease in the amount of light which passes through the one or more lenses 104.

Additionally or alternatively, the one or more lenses 104 can prevent a portion of the light from passing through the one or more lenses 104. For example, the one or more lenses 104 can be tinted. In at least one implementation, tinting the one or more lenses 104 can include placing a film over the one or more lenses 104 which reduces the amount of light which is transmitted through the one or more lenses 104. Additionally or alternatively, the material itself can reduce the amount of light transmitted through the one or more lenses.

FIG. 1 additionally shows that the interchangeable glasses system 100 can include a temple 106. The temple 106 can be configured to hold the frame 102 in place relative the user's ears. For example, the temple 106 can include a curved portion which is configured to be placed behind the user's ears. This can prevent the frame 102 from falling off when the user leans forward. The temple 106 can be between 120 mm and 150 mm in length.

FIG. 1 moreover shows that the interchangeable glasses system 100 can include an attachment 108. The attachment 108 is configured to allow a user to change the temple 106 as desired. I.e., the attachment 108 releasably attaches the temple 106 to the frame 102, allowing a user to change the temple as desired.

Figure 2A:
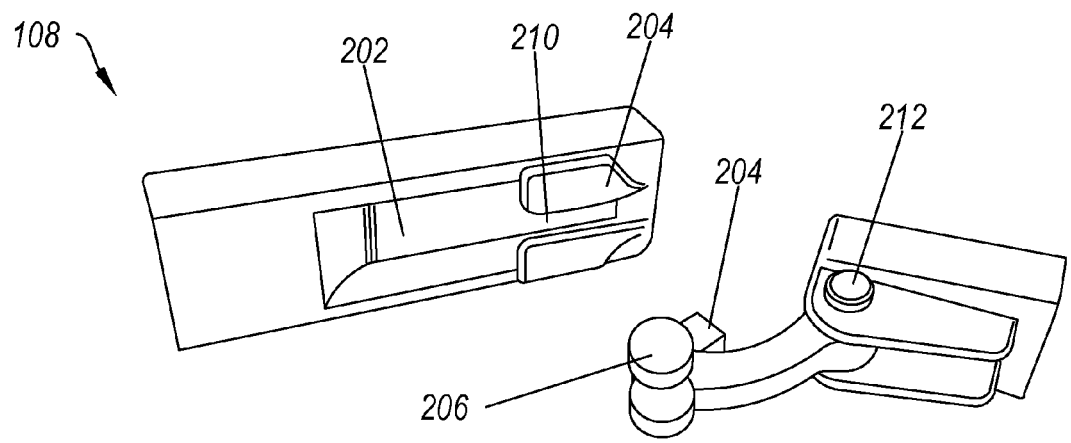
FIG. 2A illustrates a top side perspective view of the attachment.
Figure 2B:
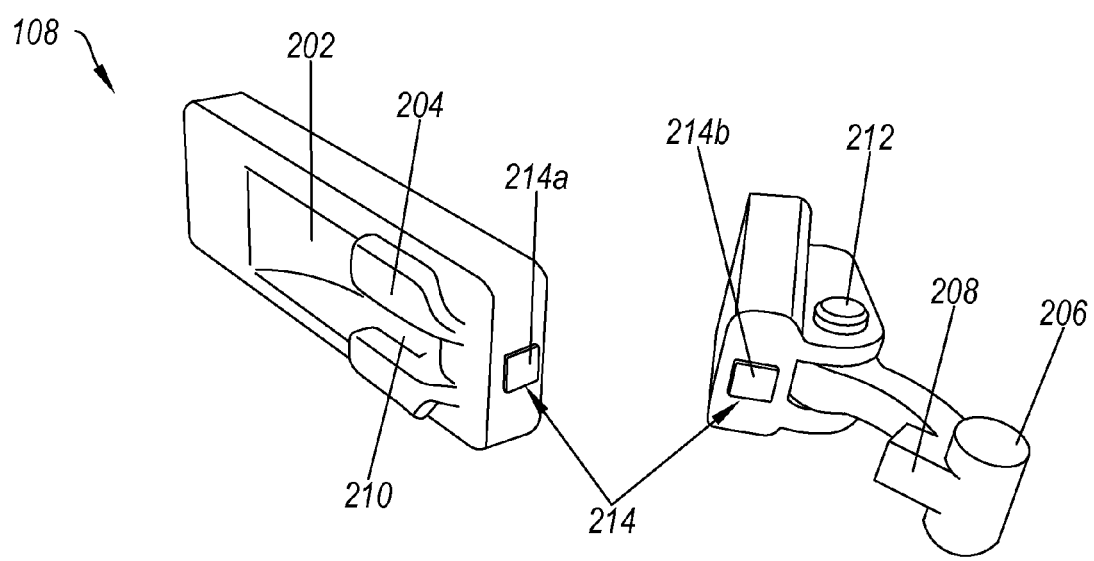
FIG. 2B illustrates a top front perspective view of the attachment.

FIGS. 2A and 2B (collectively "FIG. 2") illustrate an example of an attachment 108. FIG. 2A illustrates a top side perspective view of the attachment 108; and FIG. 2B illustrates a top front perspective view of the attachment 108. The attachment 108 allows a user to change the temple 106 as desired. I.e., the user can remove the temple 106 can attach a new temple to change to style of the glasses. This allows a user to customize the glasses.

FIG. 2 shows that the attachment 108 can include a groove 202. The groove 202 receives other parts of the attachment 108. That is, the groove 202 is a portion of the temple 106 (or frame) which is absent or removed in order to receive the parts of the attachment 108 attaching the temple 106 to the frame. The groove 202 can be in the interior portion of the glasses (i.e., on the side that will be proximate to the user's head) in order to be less visible to others.

FIG. 2 also shows that the attachment 108 can include a jacket 204. The jacket 204 covers at least a portion of the groove 202 and leaves a portion of the groove 202 uncovered. The jacket 204 thus allows lateral movement within the groove 202 but prevents movement perpendicular to the groove 202 where the groove is covered. The jacket 204 can include a single piece or two pieces, one each along the sides of the groove.

FIG. 2 further shows that the attachment 108 can include a protrusion 206. The protrusion 206 is configured to fit in the groove 202. That is, at least a portion of the protrusion 206 is received by the groove 202. A portion of the protrusion is then moved under the jacket 202, preventing the protrusion 206 from pulling out of the groove 202. When received and locked, the protrusion 206 and the groove 202 secure the frame to the temple 106.

FIG. 2 also shows that the protrusion 206 can include a projection 208. The projection 208 is received by a matching indentation within the groove 202. The projection 208 and indentation can ensure that the protrusion 206 is aligned correctly relative to the groove 202 and that the temples is, therefore, aligned relative to the frame.

FIG. 2 additionally shows that the jacket 204 can include a channel 210. The channel 210 allows the protrusion 206 to pass under the jacket 204 while within the groove 202. In particular, the protrusion 206 can be moved such that a portion moves through the channel 210 until the protrusion 206 is completely uncovered by the jacket 204, at which point the protrusion 206 may be removed from the groove 202, disconnecting the temple 106 and the frame. Likewise, the protrusion 206 may be placed in the groove 202 and slid through the channel 210 until the protrusion 206 is covered by the jacket 204 retaining the protrusion 206 within the groove 202 attaching the temple 106 to the frame.

FIG. 2 moreover shows that the attachment 106 can include a bearing 212. The bearing 212 allows the protrusion 206 to rotate relative to the frame (or temple) and, by extension, the temple to rotate relative to the frame. For example, the bearing 212 can include a shaft rotating in a hole, a hinge, or any other desired bearing mechanism. One of skill in the art will understand that other elements, such as a bushing, may be added to the bearing 212 to reduce friction.

FIG. 2 also shows that the attachment 108 can include a magnetic attachment 214. That is, the magnetic attachment 214 includes a first magnet 214a (any material affected by a magnetic field) magnetically attached to a second magnet 214b. For example, the first magnet may be attached to the temple and the second magnet 214b may be attached to the frame. As the first magnet 214a and the second magnet 214b become proximate to one another their magnetic fields induce a force which holds their position constant relative to one another, absent an external force. Thus the position of the frame and the temple relative to one another remains constant.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An interchangeable glasses system, the interchangeable glasses system comprising:
    a frame;
    one or more lenses attached to the frame;
    a temple configured to hold the frame in place relative the user's ears, wherein the temple includes an inner surface, the inner surface configured to be proximate to the user's head; and an attachment configured to releasably secure the temple relative to the frame, wherein the attachment includes:
a groove, wherein the groove is on the interior surface of the temple;
a protrusion, wherein the protrusion includes:
a first portion configured to be received by the groove; and
a second portion external from the groove, wherein the second portion includes a bearing configured to allow the protrusion to rotate; and
a jacket, wherein the jacket:
covers at least a portion of the groove;
allows movement of the first portion of the protrusion within the groove; and
prevents the first portion of the protrusion from exiting the groove.

2. The system of claim 1, wherein the one or more lenses are tinted.

3. The system of claim 1, wherein the one or more lenses are transparent.

4. The system of claim 1, wherein the temple includes a curved portion configured to be placed behind the user's ears.

5. The system of claim 1, wherein the temple is between 120 mm and 150 mm in length.

6. The system of claim 1, wherein the jacket allows linear movement of the protrusion within the groove.

7. The system of claim 1, wherein the groove is on the interior surface of the temple.

8. The system of claim 6, wherein the jacket permits lateral movement of the groove.

9. The system of claim 8, wherein the jacket prevents movement of the protrusion perpendicular to the groove.

10. The system of claim 1, wherein the protrusion includes a body, wherein the body is:
small enough to fit within the groove where the jacket does not cover the groove; and
large enough that it cannot exit the groove where the jacket covers the groove.

11. The system of claim 1, wherein the jacket includes a channel.

12. The system of claim 11, wherein the channel allows a portion of the protrusion to pass through the jacket.

13. The system of claim 1, wherein the bearing includes a shaft rotating within a hole.

14. The system of claim 1, wherein the bearing allows rotation of the protrusion relative to the temple.

15. An interchangeable glasses system, the interchangeable glasses system comprising:
a frame;
one or more nose pads attached to the frame;
one or more lenses attached to the frame;
a temple configured to hold the frame in place relative the user's ears, wherein the temple includes an inner surface, the inner surface configured to be proximate to the user's head; and
an attachment configured to releasably secure the temple relative to the frame, wherein the attachment includes:
a groove, wherein the groove:
is entirely on the interior surface of the temple; and
is parallel to the major axis of the temple;
a protrusion, wherein the protrusion includes:
a first portion configured to be received by the groove, wherein the first portion is
perpendicular to the major axis of the temple; and
a second portion external from the groove, wherein the second portion includes a bearing configured to allow the protrusion to rotate;
a jacket, wherein the jacket:
covers at least a portion of the groove;
allows linear movement of the first portion of the protrusion within the groove; and
prevents the first portion of the protrusion from exiting the groove; and
a channel through the jacket, wherein the channel allows the protrusion to pass through the jacket.

16. The system of claim 15 further comprising a magnetic attachment.

17. The system of claim 16, wherein the magnetic attachment includes a first magnet attached to the temple and a second magnet attached to the frame.

18. The system of claim 15, wherein the protrusion includes a projection, wherein the projection:
includes a portion that is aligned perpendicular to a main body of the protrusion; and
is configured to:
mate with an indentation within the groove; and
align the temple relative to the frame.

19. The system of claim 1, wherein the bearing includes a hinge.

20. An interchangeable glasses system, the interchangeable glasses system comprising:
a frame;
one or more lenses attached to the frame;
a temple configured to hold the frame in place relative the user's ears; and
an attachment configured to releasably secure the temple relative to the frame, wherein the attachment includes:
a groove;
a protrusion, wherein the protrusion includes:
a first portion configured to be received by the groove; and
a second portion external from the groove, wherein the second portion includes a bearing configured to allow the protrusion to rotate; and
a jacket, wherein the jacket:
covers at least a portion of the groove;
allows movement of the first portion of the protrusion within the groove; and
prevents the first portion of the protrusion from exiting the groove.

* * * * *